J. SIRAGUSA & R. E. WOOD.
TROLLEY HEAD AND HARP.
APPLICATION FILED MAR. 4, 1910.
994,039.
Patented May 30, 1911.
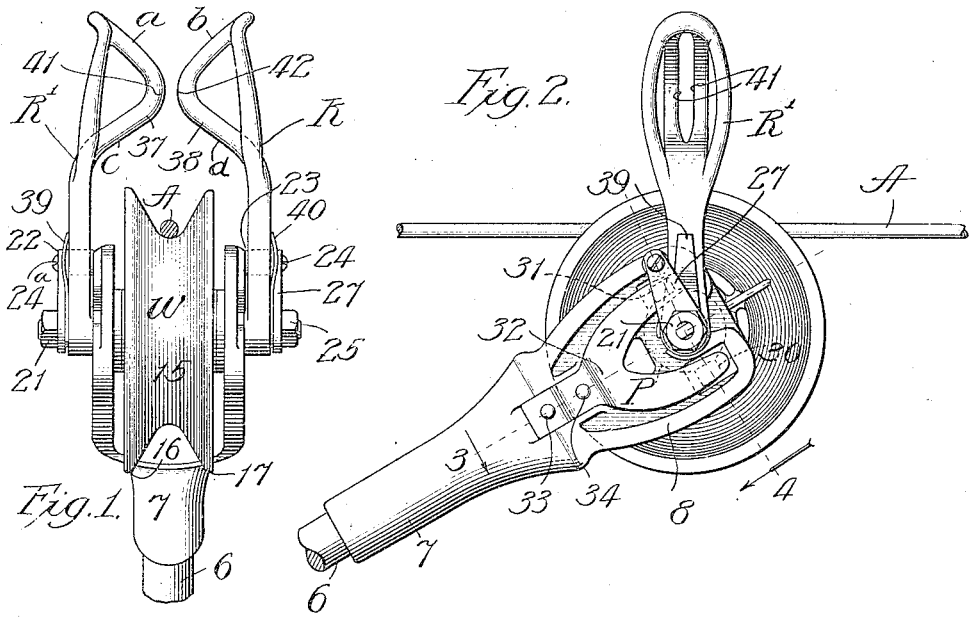
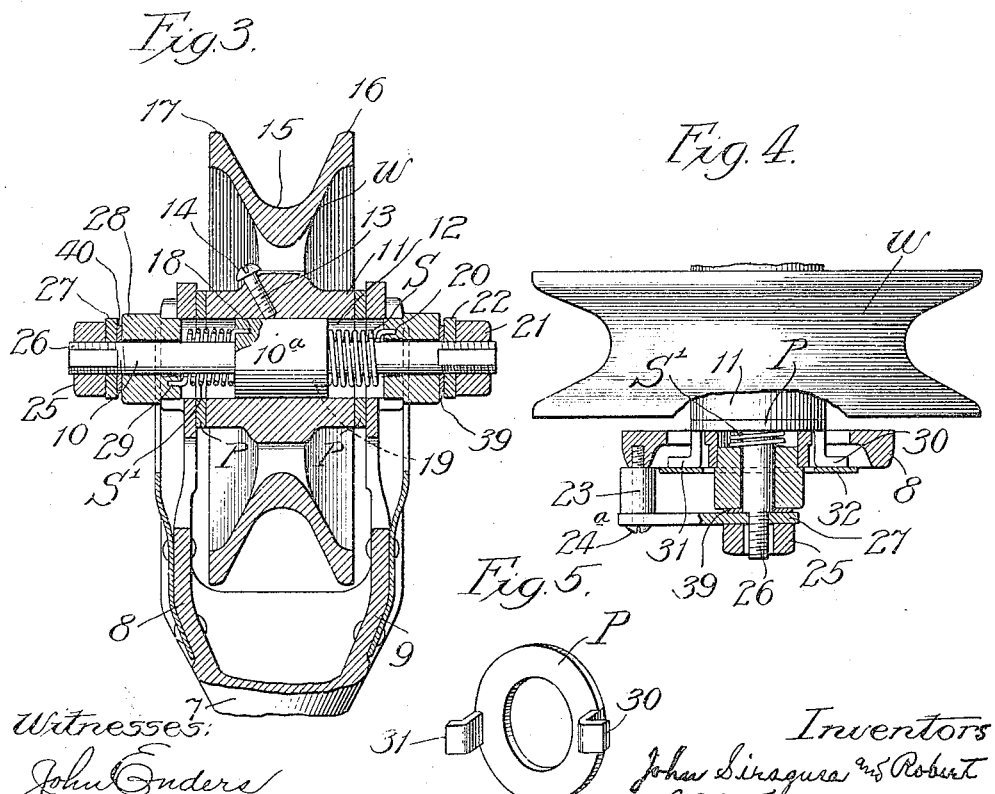

UNITED STATES PATENT OFFICE.

JOHN SIRAGUSA AND ROBERT E. WOOD, OF CHICAGO, ILLINOIS.

TROLLEY HEAD AND HARP.

994,039.         Specification of Letters Patent.         Patented May 30, 1911.

Application filed March 4, 1910. Serial No. 547,328.

*To all whom it may concern:*

Be it known that we, JOHN SIRAGUSA, a citizen of the Kingdom of Italy, and ROBERT E. WOOD, a citizen of the United States, residing in Chicago, county of Cook, and State of Illinois, have invented certain new and useful Improvements in Trolley Heads and Harps, of which the following is a specification, reference being had therein to the accompanying drawings.

Our invention relates to trolley heads and harps.

The object of the invention is to provide a simple, durable and economical device of this character which shall form a knock down clip about the trolley wire insuring the necessary electrical contact under a variety of conditions until the trolley is pulled off the wire by the operator.

It is also an object of the invention to safely arrange in protected positions parts liable to injury and to provide a compact structure which may be readily repaired.

Further objects and advantages will be more fully described hereafter and pointed out in the claims.

In the accompanying drawings, we have shown a device embodying our invention in one of its preferred forms.

Figure 1 is a front view of a harp and trolley head; Fig. 2 a side view thereof; Fig. 3 a section taken on line 3 of Fig. 2. Fig. 4 a section taken on line 4 of Fig. 2 and Fig. 5 a view in perspective of an annular contact plate for obtaining electrical connection between the wheel and clip and the harp fork.

In the drawings, 6 indicates a trolley pole, to which is welded or otherwise suitably secured a hollow harp 7 with forks 8 and 9 on opposite sides recessed at the tops to support an axle 10. The trolley wheel W, provided with a hub portion 11 and an axial opening 12, is mounted to turn loosely upon the enlarged portion $10^a$ of the axle 10. The axle may be conveniently oiled through opening 13, threaded interiorly and normally closed by the screw 14. For the purpose of maintaining electrical contact the wheel W is preferably made of copper and the harp and trolley pole of iron, or other material with less electrical conductivity. The wheel is provided with a deep circumferential groove 15 with outwardly flaring oppositely inclined flanges 16 and 17. The axle 10 is cut away at the ends as shown in Fig. 3. In the ends of axle portion $10^a$ are drilled, parallel to the axle but on opposite sides thereof, the holes 18 and 19. In the hubs of two rocking arms R R′ mounted on opposite ends thereof are similarly drilled holes 20 and 29, the former in alinement with hole 18 and the latter with hole 19. Hub 11 projecting over the ends of axle portion $10^a$ forms a cup at the ends in which are placed springs S and S′, the ends of S inserted in holes 19 and 20 and the ends of S′ in holes 18 and 29, both springs being tightly coiled like a clock spring about axle 10. The arm R is held pressed against the coil spring S by a nut 21 interiorly threaded on the outer threaded end of axle 10 and pressing against a plate 22 intermediate of the rocking arm R and the nut 21. The arms R R′ have thus capacity for bodily movement along axle 10 against tension of springs S S′. The relative positions of openings 19 and 20 in which the ends of the coiled spring S are inserted, as shown in Fig. 3, are such that the tension thereof tends to hold rocking arm R in vertical position bearing constantly upon a bumper 23, rigidly supported on a cross bar 24, one end of which is rigidly secured to the fork 9 of harp 7, and the other to the forward end of plate 22. On the other end of the axle 10, arm R′ holds spring S′ tightly coiled about axle 10. The arm is held in position by interiorly threaded nut 25 on threads 26 of axle 10 which operates against plate 27 to hold the hub portion 28 of rocking bar R′ against the outward pressure of spring S′. The tension of this spring and the relative positions of the openings 18 and 29 are such that the tension thereof tends to hold rocking arm R′ against a bumper $24^a$ mounted on bifurcated piece 8 of harp 7 and the rear end of plate 27.

Rigidly mounted intermediate of the hub portion 11 of wheel W and fork 8 on one side and fork 9 on the other, are the annular contact plates P, shown in Fig. 5. Each of these plates is provided on the side adjacent to the fork with lugs 30 and 31 projecting therethrough and contacting with the forks of a Y shaped piece 32 secured at 33 and 34 in any suitable manner to the harp 7. These Y shaped pieces are in ultimate electrical contact with the motor in the car, and are preferably constructed of copper. The plates P are also preferably constructed of copper, as is the wheel W and the rocking arms R and R', so that the electrical current in the wire A may be communicated whenever the wire touches any portion, either of the wheel W or the arms R R'.

The rocking arms R R' are so mounted on the shaft 10 as to have a slight lateral rocking movement thereon and at their upper ends said arms are provided on their adjacent sides with the curved surfaces or bows 37 and 38, constructed as shown in Figs. 1 and 2. These surfaces are curved as shown, so as to form a clip about the wire A. It will be observed that they are inclined outwardly and oppositely at the points $a$ and $b$ and inwardly and oppositely at the points $c$ and $d$. At their points of nearest approach they are held so close together that when the wire enters or leaves the clip thereby formed they must be pushed apart against a yielding resistance. This we prefer to provide on the axle 10 intermediate of the plates 27 and 22 and arms R R' by mounting upwardly projecting springs 39 and 40, curved as shown in Fig. 1, adapted to exert tension upon the arms R and R' and press their upper ends toward each other. The springs 39 and 40 are adapted to hold the surfaces 41 and 42 so near together that the space between is less than the diameter of the wire A. It will thus be seen that when the trolley spring (not shown) is released to raise the trolley to approach the wire A that it is no very difficult matter for the operator to bring one or the other of the surfaces $a\ b$ underneath the wire, and that when this is done the wire itself guides the trolley so that it rides upon these inclined surfaces, pushing the surfaces 41 and 42 apart and dropping into a concave groove 15 on the wheel W. When the trolley passes over a crossing the arms R R', being elastically supported on axle 10 by the springs S S', are thrown down by the cross guard and immediately thereafter assume their upright position. In the upright position should the wire leave the groove 15 it will contact with the surfaces $c$ and $d$ until restored. When the trolley is pulled down, the wire A slips down the inclined surfaces $c$ and $d$, presses apart rocking arms R R' at the points 41 and 42 and is freed.

We are aware that many modifications of our invention will occur to those skilled in the art, and we do not wish to be understood as limiting ourselves to the preferred form herein described and shown, but

What we claim is:—

1. In a trolley head and harp, the combination with an axle and a trolley wheel mounted thereon, of arms mounted to turn on said shaft at each side of said wheel and also to have a slight lateral rocking movement thereon, elastic yielding means for normally holding said arms erect above said wheel, and also tending to press the lower ends of said arms away from said wheel, and means for yieldingly pressing the upper ends of said arms toward each other.

2. In a trolley head and harp, an axle having end portions of less diameter than the middle portion thereof, a trolley wheel mounted to rotate upon said middle portion having a hub projecting at each side beyond said middle portion to form spring receiving recesses, arms loosely mounted on the end portions of said axle at each side of said wheel, springs coiled about the reduced portions of said axle within said recesses, each spring having one end secured to the axle and the other end secured to one of said arms, said springs operating to normally hold said arms in a substantially vertical position, and also tending to press the lower ends of said arms outwardly, and means for yieldingly pressing the upper ends of said arms toward each other.

In testimony whereof we have hereunto affixed our signatures in the presence of two witnesses.

JOHN SIRAGUSA.
ROBERT E. WOOD.

Witnesses:
ROBERT CATHERWOOD,
NELLIE R. CALLAHAN.